United States Patent

Lu et al.

[11] 4,208,739
[45] Jun. 17, 1980

[54] INTEGRATED ENCRYPTION AND CHANNEL CODING TECHNIQUE

[75] Inventors: Shyue-Ching Lu; Lin-nan Lee, both of Gaithersburg; Russell J. F. Fang, Brookeville, all of Md.

[73] Assignee: Communications Satellite Corporation, Washington, D.C.

[21] Appl. No.: 926,370

[22] Filed: Jul. 20, 1978

[51] Int. Cl.² ............................................. H04L 9/00
[52] U.S. Cl. .......................................... 375/2; 371/43
[58] Field of Search ................. 178/22; 340/146.1 AQ

[56] References Cited

U.S. PATENT DOCUMENTS

| | | | |
|---|---|---|---|
| 3,718,905 | 2/1973 | Tong | 340/146.1 AQ |
| 3,988,677 | 10/1976 | Fletcher et al. | 340/146.1 AQ |

OTHER PUBLICATIONS

*Principles of Communication Engineering*, Wozencraft and Jacobs, Wiley & Sons, 1965, pp. 425-454.

Primary Examiner—Howard A. Birmiel
Attorney, Agent, or Firm—Sughrue, Rothwell, Mion, Zinn and Macpeak

[57] ABSTRACT

The integrated data enciphering and channel encoding system consists of a message expansion function F, a convolutional encoder $G_e$ of code rate $r_e$ greater than the computational cutoff rate $R_{comp}$, and an artificial noise generator emitting a noise sequence $\underline{n}$. The expansion function F is the key to this integrated cryptosystem and can be any linear time varying or time invariant function, with or without memory. It can also be a block code or a convolutional code itself provided that the resultant concatenated convolutional code is non-catastrophic. The concatenation of the expansion function F with $G_e$ is equivalent to a new convolutional encoder $G_d = FG_e$ of code rate $r_d$ less than the computational cutoff rate $R_{comp}$ of the equivalent channel, but without knowledge of the expansion function F or the artificial noise $\underline{n}$, the transmitted information rate appears to exceed $R_{comp}$. Thus, an opponent can only attempt to intercept the original message by decoding the code $G_e$, but the information rate $r_e$ exceeding $R_{comp}$ will prevent this. The output of the encoder plus the noise sequence $\underline{n}$ is the cryptogram $\underline{x}$ which is transmitted over a noisy channel characterized by the additive noise sequence $\underline{z}$. The corrupted version of the cryptogram $\underline{y}$ which is received at the receiving end is regarded as the output of the equivalent convolutional encoder $G_d$ plus noise $\underline{e}$ equivalent to the sum of the artificial noise $\underline{n}$ and the channel noise $\underline{z}$. Therefore, the integrated channel decoder and deciphering system simply consists of a sequential decoder for $G_d = FG_e$.

10 Claims, 8 Drawing Figures

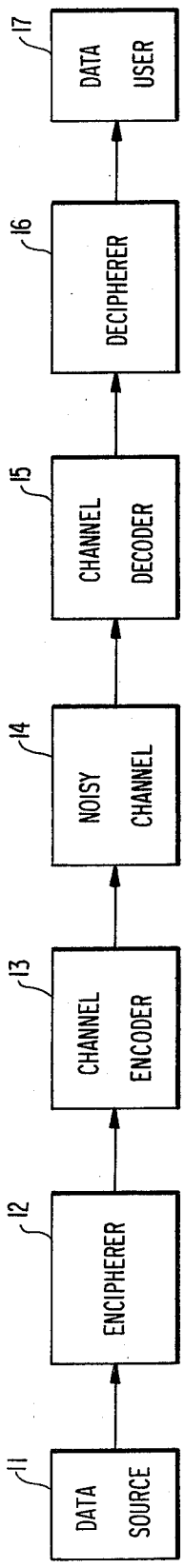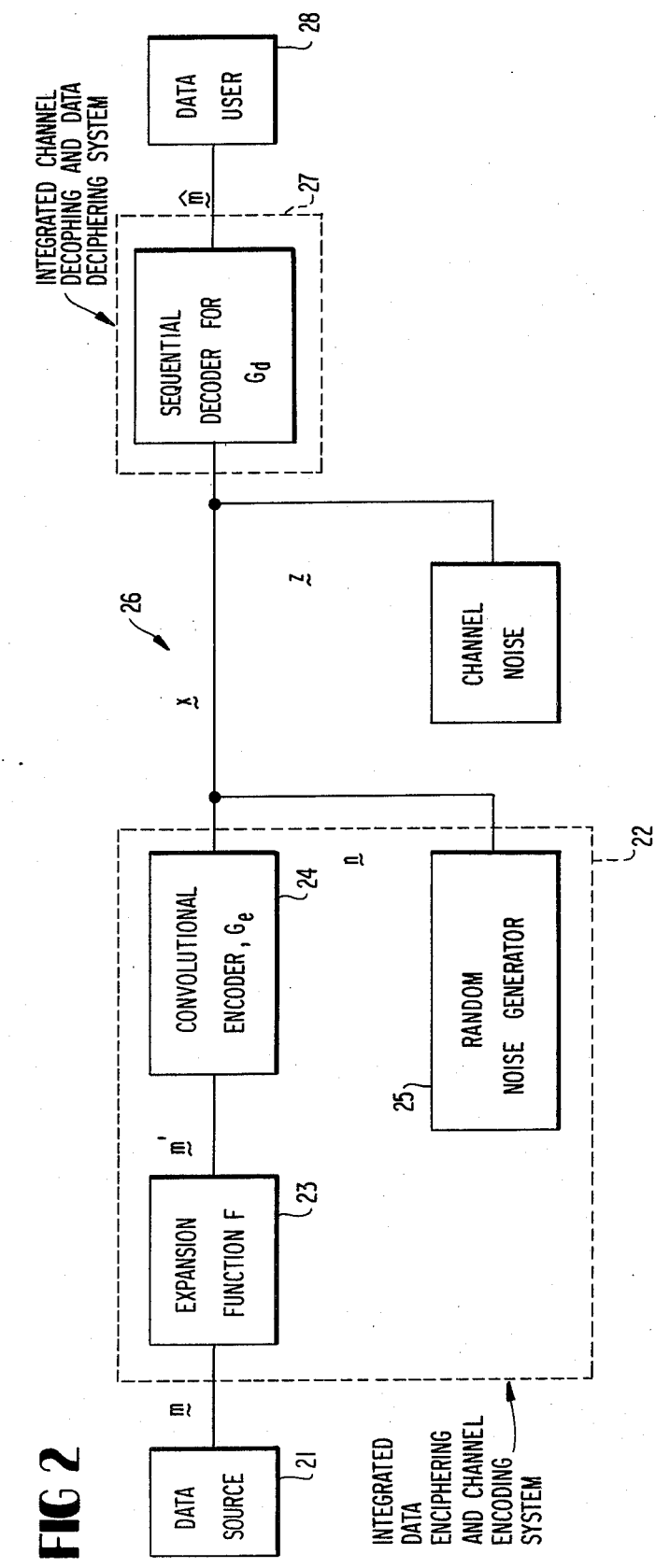

INTEGRATED ENCRYPTION AND CHANNEL CODING TECHNIQUE

BACKGROUND OF THE INVENTION

The present invention is directed to a technique for encryption and channel encoding of messages to provide both security and reliability of transmission over noisy channels. More particularly, the invention resides in an integrated encryption and coding technique which, without knowing the key to the system, is computationally infeasible to break by a cryptanalyst even with the most sophisticated computer.

The invention combines in an integrated system two independent concepts: (1) error-correction channel coding techniques for reliable and accurate transmission of data or messages; and (2) cryptographic techniques for privacy or security of data or messages which must be protected. The implementation of the two techniques in a single system is not new. A typical block diagram for accurate and secure data transmission over noisy channels is shown in FIG. 1. In this system, the output of the data source 11 is supplied to an encipherer 12 of any well-known design, such as a pseudo-random noise generator, which "scrambles" the input data. The enciphered data is then encoded by a forward-error-correcting code by channel encoder 13 before transmission over the noisy channel 14. The forward-error-correcting code may be either a block code or a tree code, such as a convolutional code, both of which are well known in the art. For details of such codes and techniques of implementing the same, reference may be had to any one of several standard texts in the field of which the following are but examples:

Berlekamp, Elwyn R., *Algebraic Coding Theory*, McGraw-Hill Book Company (1968).

Peterson, W. Wesley, and E. J. Weldon, Jr., *Error-Correcting Codes*, 2d Ed., The MIT Press (1972).

Wozencraft, J. M., and I. M. Jacobs, *Principles of Communication Engineering*, John Wiley & Sons (1965).

At the receiver, the encoded and enciphered data corrupted by channel noise is first decoded by a channel decoder 15 which, if the encoder 13 is a block code encoder, performs what is known in the art as max-imum-likelihood decoding or, if the encoder 13 is a convolutional encoder, may be a Viterbi or sequential decoder, both of which are well known in the art. Usually, forward-error-correcting channel codes are employed to reduce the transmission errors caused by channel noise to such an extent that the errors present in the decoded data stream are practically negligible. This decoded data stream is then deciphered by decipherer 16 to reconstitute the original data or message for the data user 17.

While the system shown in FIG. 1 would appear to accomplish the desired objectives in a straightforward manner, there are serious problems in a practical implementation of the system. The separate data encryption and channel coding and corresponding separate channel decoding and deciphering results in an overall system which is both very complex and very costly. Moreover, most cryptosystems require that the encipherer and decipherer maintain synchronization, and this can be a potential weakness of such a cryptosystem.

SUMMARY OF THE INVENTION

It is therefore an object of the present invention to provide an integrated data encryption and channel coding scheme which can significantly reduce the system complexity and cost, as compared with those using separate data encryption and channel coding techniques.

It is another object of the present invention to provide an integrated encryption and channel coding technique which will not only correct and hence reduce errors caused by channel noise but will also protect message privacy against the most sophisticated opponents, who may have the most powerful computers in the world to decipher the message electronically.

The technique according to the invention is implemented with an integrated data enciphering and channel encoding system at the transmitter and an integrated channel decoder and deciphering system at the receiver connected by a noisy channel. The noisy channel can be a transmission channel, such as a telephone line or a space link, or a storage device, such as a magnetic-tape unit, or a combination thereof.

The integrated data enciphering and channel encoding system consists of a message expansion function F, a convolutional encoder $G_e$ of code rate $r_e$ and an artificial noise generator emitting a noise sequence $\underline{n}$. The expansion function F is the key, which must be kept secret, to this integrated cryptosystem and can be any linear time varying or time invariant function, with or without memory. It can also be a block code or a convolutional code itself provided that the resultant concatenated convolutional code is non-catastrophic. The concatenation of the expansion function F with $G_e$ is equivalent to a new convolutional encoder $G_d \equiv FG_e$ of code rate $r_d$ less than $r_e$. Thus, knowing F, the code rate $r_d$ is less than the computational cutoff rate $R_{comp}$ of the equivalent channel with noise $\underline{n}+\underline{z}$, but without knowledge of the expansion function F, the transmitted information rate can be made to appear to exceed $R_{comp}$. The output of this encoder plus the noise sequence $\underline{n}$ is the cryptogram $\underline{x}$ which is transmitted over a noisy channel characterized by the additive noise sequence $\underline{z}$. The corrupted version of the cryptogram $\underline{y}$ which is received at the receiving end is regarded as the output of the equivalent convolutional encoder $G_d$ plus noise $\underline{e}$ equivalent to the sum of the artificial noise $\underline{n}$ and the channel noise $\underline{z}$. Therefore, the integrated channel decoder and deciphering system simply consists of a sequential decoder for $G_d = FG_e$.

The invention not only achieves the specific objectives of simpler and more cost-effective system design as well as improved security of communications, the invention additionally possesses the following major advantages:

(1) The technique according to the invention is adaptable to different channel conditions by adjusting the noise sequence $\underline{n}$, thereby maximizing the security of communications.

(2) The technique is secured from "known plain text attack" in which a cryptanalyst has the knowledge of the message, the corresponding cryptogram and the convolutional code $G_e$, and tries to find the key, i.e., the expansion function F.

(3) The inventive technique is secure from electronic attack by exhaustive search of the key F on the most sophisticated computers.

(4) Systems implemented according to the invention are most suitable for continuous traffic operation and high data rate applications.

(5) The invention provides very rich key space for the expansion function F, which can be any time varying or time invariant function, with or without memory, and it can be a block or convolutional code itself. A simpler key distribution and crypto synchronization results, however, if F is time invariant.

DETAILED DESCRIPTION OF THE DRAWINGS

The foregoing and other objects, aspects and advantages of the invention will be better understood from the following detailed description with reference to the accompanying drawings, in which:

FIG. 1 is a block diagram of a typical separate date encryption and channel coding system for secure data communications;

FIG. 2 is a block diagram of the integrated data encryption and channel coding system implementing the technique according to the invention;

DESCRIPTION OF THE PREFERRED EMBODIMENT

Figure 3A:
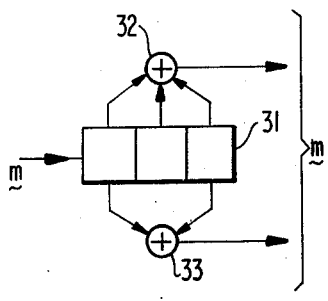
FIGS. 3a, 3b and 3c are block diagrams of an expander, convolutional encoder and an equivalent convolutional encoder, respectively, illustrating a simplified example of a specific embodiment of the integrated data encryption and channel coding system shown in FIG. 2.

Referring now to the drawings and, more particularly, to FIG. 2, the data source 21 supplies a message sequence $\underline{m}$ to the integrated data enciphering and channel encoding system 22. The integrated data enciphering and channel encoding system 22 consists of a message expander 23 having an expansion function F, a convolutional encoder 24 encoding the code $G_e$ of code rate $r_e$ and an artificial noise generator 25 emitting the noise sequence $\underline{n}$. The expansion function F can be any linear time varying or time invariant function, with or without memory. It can also be a block code or a convolutional code itself provided that the resultant concatenated convolutional code is non-catastrophic. For a definition of a "non-catastrophic" code, reference is made to J. L. Massey and M. K. Sain, "Inverses of Linear Sequential Machines" *IEEE Transactions on Computers*, Volume C-17, No. 4, Apr. 1968, pages 330-337.

This expansion function F is the key of this integrated cryptosystem and must be kept secret. A message sequence $\underline{m}$ from the data source is first transformed into the sequence $\underline{m}'$ by the expander 23 and then encoded by the convolutional encoder 24. This encoded sequence is added to the artificially generated noise sequence $\underline{n}$ from noise generator 25 to generate the cryptogram $\underline{x}$. The transformation from the data source output $\underline{m}$ to the cryptogram $\underline{x}$ is the integrated data enciphering and channel encoding system.

After the cryptogram $\underline{x}$ is transmitted over a noisy channel 26 characterized by the additive noise sequence $\underline{z}$ in FIG. 2, a corrupted version of the cryptogram $\underline{y}$ is received at the receiving end. In other words, $\underline{y}=\underline{x}+\underline{z}=(\underline{m}FG_e+\underline{n})+\underline{z}=\underline{m}(FG_e)+\underline{e}$, where $\underline{e}=\underline{n}+\underline{z}$ is the sum of the artificial noise $\underline{n}$ and the channel noise $\underline{z}$.

Since the concatenation of any linear function F with $G_e$ is equivalent to a new convolutional encoder $G_d=FG_e$, the received sequence $\underline{y}$ can thus be regarded as the output of the equivalent convolutional encoder $G_d$ plus the equivalent noise $\underline{e}$. Since F is an expansion function, the resultant code rate $r_d$ of the equivalent code $G_d$ is lower than $r_e$. When the expansion function F is so chosen that its inverse can be implemented by a feed-forward linear sequential circuit, the equivalent code $G_d$ is non-catastrophic if and only if $G_e$ is non-catastrophic. Since a non-catastrophic convolutional code $G_e$ with a reasonable good distance property can be easily obtained, the message sequence $\underline{m}$ can be recovered accurately (or reliably) from the received sequence $\underline{y}$ by the use of sequential decoding provided that the information rate $r_d$ over the equivalent channel is less than the computational cutoff rate $R_{comp}$ of the equivalent channel. Since F and $G_e$ are known at the receiving end, the sequential decoder for $G_d=FG_e$ can be easily constructed. This sequential decoder is the integrated channel decoding and data deciphering system 27. The output $\underline{m}$ of the sequential decoder 27 is provided to the data user 28.

This unique combination of the expansion function F, the convolutional encoder and the artificial random noise n provides the new integrated data encryption and channel coding technique. With this unique scheme, the sequential decoder with knowledge of F and $G_e$ becomes a new and unique integrated channel decoder and data decipherer.

It should be noted that in some satellite or space communications applications, the artificial random noise generator 25 at the integrated date encipher and channel encoder 22 may not be needed if the uplink is sufficiently noisy but not so noisy that sequential decoding at the receiving end would fail, i.e., the resultant noise $\underline{e}$ would still yield an $R_{comp}$ greater than $r_d$. Furthermore, in the event of the discovery of new decoding algorithm for reliable transmissions at rates above $R_{comp}$, there should always be a similar threshold of transmission rate above which reliable transmission of information is infeasible (channel capacity, for example). Consequently, the same scheme is readily available.

Having described the invention in general terms, a specific example will serve to further clarify the principles of operation of the invention. It will be assumed that the expansion function F is itself a convolutional code, and the expander 23 is implemented as shown in FIG. 3a and comprises a three-stage shift register 31 and two exclusive OR gates 32 and 33. Stages 1, 2 and 3 of the shift register 31 are connected to exclusive OR gate 32, while only stages 1 and 3 are connected to exclusive OR gate 33. The message sequence $\underline{m}$ is applied to the first stage of shift register 31, and the expanded message sequence $\underline{m}'$ is derived from the two outputs of exclusive OR gates 32 and 33.

Figure 3B:
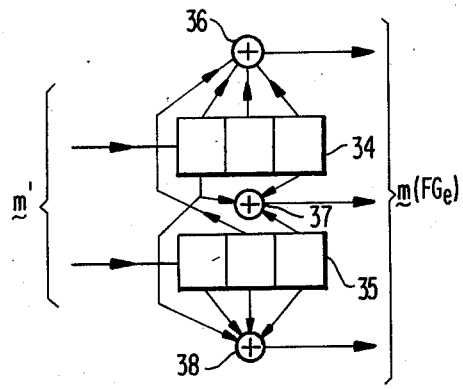
Figure 4A:
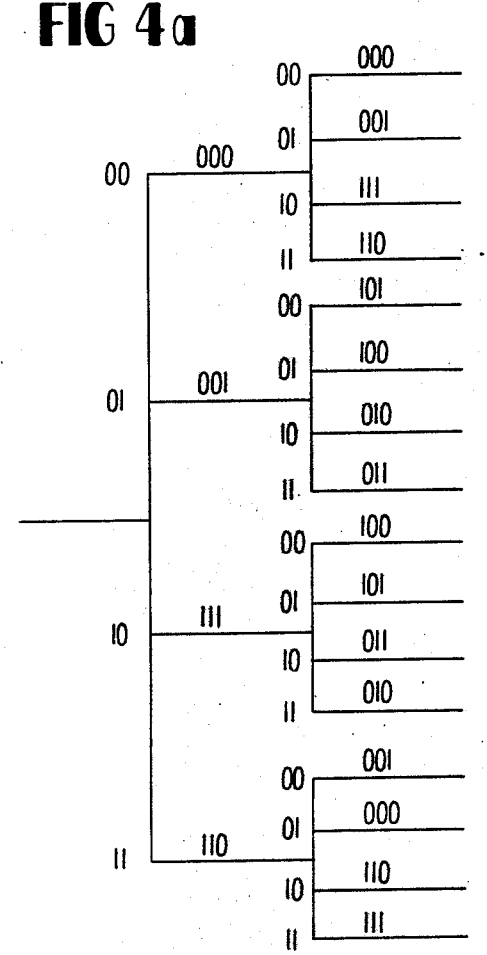
FIGS. 4a and 4b are code trees for the convolutional encoder and equivalent convolutional encoder shown in FIGS. 3b and 3c, respectively.

FIG. 3b shows an implementation of the convolutional coder 24 having a rate of ⅔. This coder comprises two three-stage shift registers 34 and 35 and three exclusive OR gates 36, 37 and 38. All three stages of shift register 34 plus the second stage of shift register 35 are connected to exclusive OR gate 36, the first and third stages of shift register 34 plus the third stage of shift register 35 are connected to exclusive OR gate 37, and all three stages of shift register 35 plus the first stage of shift register 34 are connected to exclusive OR gate 38. The expanded message sequence $\underline{m}'$ from the outputs of exclusive OR gates 32 and 33 is supplied to the inputs of shift registers 34 and 35, and the outputs from exclusive OR gates 36, 37 and 38 comprise the expanded and encoded message sequence m(FG$_e$). The operation of the encoder shown in FIG. 3b is illustrated by the code tree in FIG. 4a. It will be observed that since there are four possible states of the expanded code sequence m at any instant in time, there are four branches at each node in the code tree.

Figure 3C:
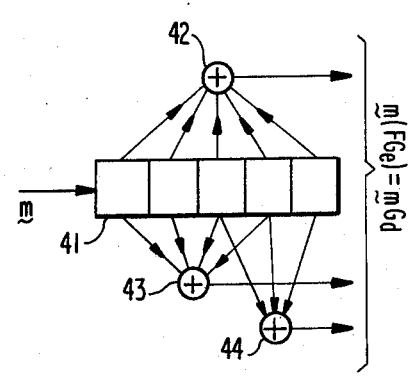
Figure 4B:
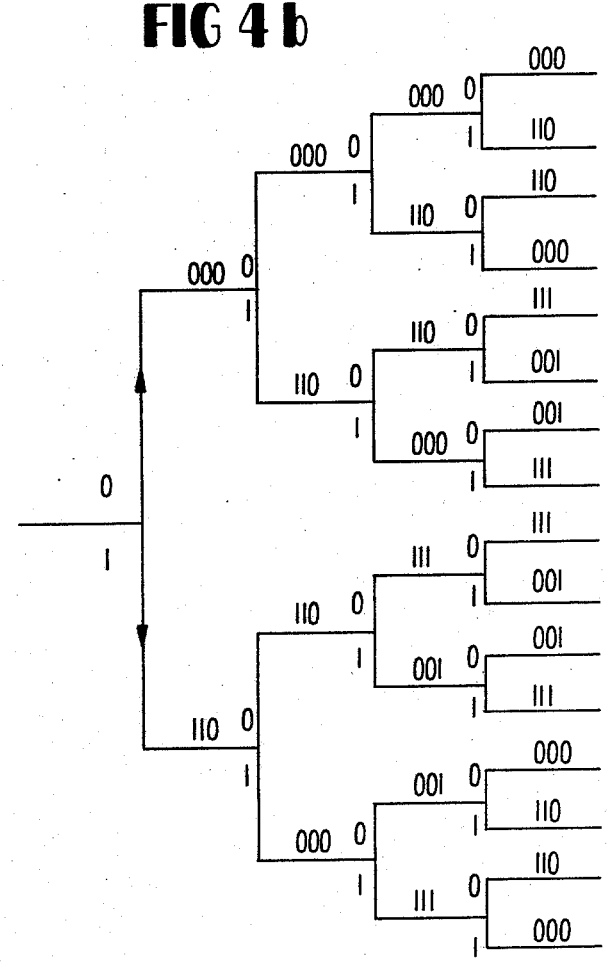

The equivalent encoder which results from the concatenation of the expansion function F of the expander shown in FIG. 3a and the convolutional Code G$_e$ of the encoder shown in FIG. 3b is shown in FIG. 3c. In this equivalent encoder, the message sequence m is supplied to the first stage of a five-stage shift register 41. All five stages of the shift register are connected to exclusive OR gate 42, the first four stages are connected to exclusive OR gate 43, and only the last three stages are connected to exclusive OR gate 44. The three outputs of exclusive OR gates 42, 43 and 44 comprise the expanded and encoded message sequence m(FG$_e$)=mG$_d$. The code tree for the equivalent encoder of FIG. 3c is shown in FIG. 4b, and it will be observed that this code tree incorporates both the expansion function F and the convolutional code G$_e$ of the expander shown in FIG. 3a and the encoder shown in FIG. 3b, respectively.

Figure 5:
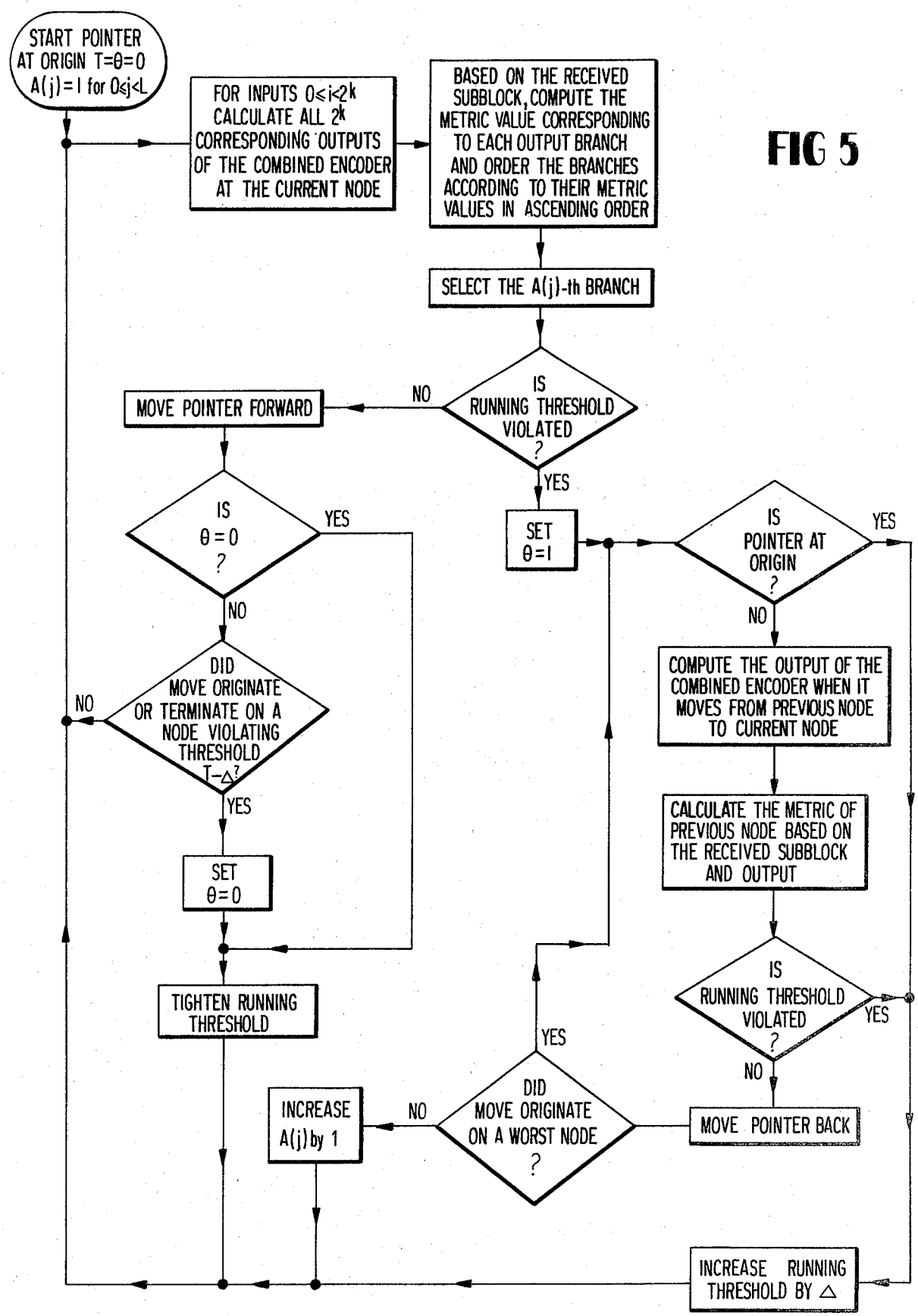
FIG. 5 is a flow diagram based on the Fano algorithm illustrating a specific implementation of the sequential decoder for a given convolutional code $G_e$ and expansion function F.

The sequential decoder 27 for the convolutional code G$_d$ is preferably implemented according to the Fano algorithm, although other sequential decoding algorithms could be used. For a detailed discussion of sequential decoding in general and the Fano algorithm in particular, reference may be made to the above-referenced text by Wozencraft and Jacobs at pages 425-454, and especially pages 431-438. As applied to the specific example given in FIGS. 3a, 3b and 3c, implementation of the sequential decoder 27 is illustrated by the flow diagram of FIG. 5. The decoder considers one node of the code tree of FIG. 4b with a movable search node pointer and maintains a running threshold T equal to kΔ, where k is an integer and Δ is a fixed threshold increment. In the specific example of the code tree in FIG. 4b, k is equal to 1. θ is a flag bit which is either 0 or 1 used for internal housekeeping to indicate whether a node in the code tree violated the running threshold A(j) is also a housekeeping function representing the jth branch of the code tree, where L is the total number of branches in the code tree. Setting A(j)=1 simply means choosing the best choice among the branches at a particular node. To illustrate by way of example, suppose that the input sequence to the decoder is 001. With reference to FIG. 4b, the best choice at the first node is the upper branch since 000 differs from 001 by only one bit, whereas 110 differs from 001 by three bits. In other words, A(1)=1 means that, for this example, the branch 000 is chosen. Should it turn out that this branch does not lead to proper decoding of the input sequence, A(j) is increased by 1, meaning that the node pointer is moved back to the preceding node and the next best choice is made. Again, in our specific example, A(1)=2 or the branch 110 is chosen. The node pointer movement is controlled by the flow diagram of FIG. 5, and reference is made thereto for a full understanding of the operation of the sequential decoder.

Generally, the security strength of most conventional cryptosystems is based upon how large is the key space. Since ample expansion functions are readily available to the system, a large key space can be generated. The fact that the cutoff rate R$_{comp}$ of the equivalent channel can be controlled by the message sender makes it impractical for the cryptanalysts even to estimate the code rate r$_d$ of the equivalent code, and thus the rate of expansion in F. The fact that the equivalent convolutional code G$_d$ must possess reasonable distance property does not cause any difficulties because the random coding theorem ensures that most of the codes are "good." The requirement that the equivalent code must be "non-catastrophic" can easily be satisfied by choosing a non-catastrophic convolutional code for G$_e$ and an expansion function whose inverse can be implemented by a Feed Forward Linear Sequential Circuit (FFLSC). Since a convolutional code has an FFLSC inverse, if and only if it is non-catastrophic, the inverse of the equivalent code $$G_d^{-1} = (FG_e)^{-1} = G_e^{-1}F^{-1}$$

can also be implemented by an FFLSC. It is, therefore, non-catastrophic. Since there are a large number of expansion functions with this property, the "non-catastrophic" requirement does not present any significant limitation to the key space either.

A known plain-text attack by the cryptanalyst to directly find the equivalent code G$_d$ seems unlikely because of the existence of the artificial noise n introduced at the encipherer. With the knowledge of the encoder G$_e$, an easier attack would appear to be to estimate the expanded sequence m' by decoding the convolutional code G$_e$ and then to find out the expansion function F. Such an attack can be avoided by controlling the artificial noise generator in such a way that the R$_{comp}$ of the equivalent channel is less than the rate r$_e$ of the convolutional code G$_e$ but is still greater than r$_d$ of the equivalent code G$_d$, i.e., $$r_d < R_{comp} < r_e.$$

With these selections of R$_{comp}$ and r$_e$, decoding of the long convolutional code G$_e$ becomes infeasible since an algorithm for decoding long constraint-length convolutional codes is not yet known for transmission rates higher than R$_{comp}$. For example, the number of computations of a sequential-type decoder grows exponentially when the code rate is above R$_{comp}$. A threshold-type decoder may have no computational problem, but its estimates of the transmission sequence are too erroneous to be useful at rates above R$_{comp}$. The maximum-likelihood Viterbi decoder may provide a better estimate than the threshold-type decoders. Also, its computational complexity is independent of the quality of the channel. However, the complexity of a Viterbi decoder grows exponentially with the constraint length of the convolutional code, and, hence, it is practically infeasible to use a Viterbi decoder to decode a convolutional code of sufficiently long constraint length. Of course, it may be possible to reduce the complexity of a Viterbi decoder by the so-called "reduced states" technique at the expense of performance. However, at rates above R$_{comp}$, the operation of a "reduced states" decoder is extremely difficult because those states in the reduced-states Viterbi decoder must be reset very frequently in order to prevent error propagation. The estimate of the transmitted sequence made by such a decoder, like that of a threshold-type decoder, is unlikely to be useful for cryptanalysis because of a large number of errors.

This cryptosystem is best suitable for constant traffic operations. A constant traffic not only adds an additional degree of security to the messages but also increases the difficulty of off-line cryptanalysis.

Obviously, the cryptosystem according to the invention can achieve its goal of secrecy only at the expense of bandwidth expansion and therefore of throughput reduction. For the system to be of any practical value, the reduction of the throughput must be sufficiently small to be acceptable. For simplicity, we consider only the hard-decision case where the receiver makes a binary decision at each time instant, although the same discussions can easily be extended to the "soft-decision" case where the receiver outputs not only its decision but also some reliability information about its estimate. The equivalent channel can be regarded as a Binary Symmetric Channel (BSC) with cross-over probability $\epsilon$. It can also be considered as the concatenation of a BSC with a cross-over probability p representing the artificial noise $\underline{n}$ introduced by the encipher with another BSC with a cross-over probability q representing the actual channel noise $\underline{z}$ so that $\epsilon = p + q - 2pq$. The cutoff rate $R_{comp}$ of the equivalent BSC is given by $1 - \log_2[1 + 2\sqrt{\epsilon(1-\epsilon)}]$. In Table I, the values of the cutoff rate of the equivalent BSC corresponding to a range of cross-over probabilities $\epsilon$ are given. A three- to four-fold bandwidth expansion is sufficient for a moderate strength of security, and a six- to ten-fold expansion will achieve a very high level of security. Of course, the cost increases rapidly if a higher cross-over probability is desired.

TABLE I

The Cutoff Rates Of A BSC Corresponding To Several Values Of Cross-Over Probability $\epsilon$

| $\epsilon$ | $R_{comp}$ |
|---|---|
| 0.08 | 0.375 |
| 0.10 | 0.322 |
| 0.15 | 0.225 |
| 0.20 | 0.152 |
| 0.25 | 0.100 |

If the integrated crypto and communications system is designed to operate at a channel cross-over probability $\epsilon$, it does not pay to design a communications system that will yield a bit error rate very much less than $\epsilon$. Since $\epsilon = p + q - 2pq$, which is approximately equal to p if $q << \epsilon$, reduction of q by increasing the transmitted power of the communications will not improve the quality of services delivered to the user after decryption. Therefore, considerable cost savings might be realized by properly balancing p and q without making q unnecessarily small by using unnecessarily large transmitted power. For example, if a cross-over probability $\epsilon$ of 10% is desired, one may only require the bit error rate q of the communications system be limited below 3%, as the encipherer having an equivalent cross-over probability p of about 7% since $\epsilon = p + q$ for small p and q. Therefore, it appears that this cryptosystem is particularly attractive in wideband, power-limited applications, such as deep space and some satellite channels.

It should be noted that the degradation due to precipitation may also be compensated by the dynamic adjustment of the artificial noise generator $\underline{n}$ in the encipherer. For satellite communications applications where downlink noise often dominates, however, care must be taken such that a minimum degree of security can be maintained. For instance, the cryptanalyst may be at a location with a clear-sky condition or may have a receiver with much better performance, in which case, the rate $r_e$ must be sufficiently high such that the $R_{comp}$ under clear-sky condition is still lower than $r_e$. On the other hand, the artificial noise generator at the encipherer may no longer be needed if the up-link is sufficiently noisy but not so noisy that sequential decoding at the decipherer would fail. Therefore, the invention has applications in secure satellite communications where the up-link noise is reasonably significant but not negligible.

In general, the expansion function F can be any linear function, either time varying or time-invariant, either with memory or without. It can be a block or convolutional encoder itself. Since the strength of the cryptosystem proposed here is based on the size of the key space, the security of this system is not reduced even if the key space is limited to time-invariant functions. This may also lead to potential cost savings in reducing the problem of key distribution and crypto synchronization. Furthermore, sequential decoders for convolutional codes at data rates up to 1 megabit per second are readily available, and it is relatively easy and straightforward to incorporate the expansion function into the decoders. Therefore, the cryptosystem according to the invention has useful applications in high data rate channels.

Throughout our discussion, we have made use of the fact that reliable transmission of information at a code rate above $R_{comp}$ is not feasible. It should be noted that to provide additional margin, the system can be designed such that $$r_d < R_{comp} < C < r_e,$$

where C is the capacity of the equivalent channel with noise $\underline{e}$. As Shannon has shown in his pioneering work, reliable transmission of information at rates above channel capacity is impossible. Thus, the security of the cryptosystem is further enhanced.

What is claimed is:
1. A method of encryption and channel coding for reliable and secure data communication between a data source and a data user comprising the steps:
   expanding a message sequence $\underline{m}$ from said data source with an expansion function F to produce an expanded message sequence $\underline{m}'$;
   encoding said expanded message sequence $\underline{m}'$ using a convolutional code $G_e$ of rate $r_e$ exceeding a computational cutoff rate $R_{comp}$, resulting in an equivalent convolutional code $G_d$ of rate $r_d$ less than $R_{comp}$, where $G_d = FG_e$ to produce a cryptogram $\underline{x}$;
   transmitting the cryptogram $\underline{x}$ over a noisy channel characterized by the additive noise sequence $\underline{e}$ and having said computational cutoff rate $R_{comp}$, resulting in a corrupted version of the cryptogram $\underline{y}$, where $\underline{y} = \underline{x} + \underline{e} = \underline{m}(FG_e) + \underline{e}$; and
   receiving said corrupted version of the cryptogram y and decoding the same with a sequential decoder which decodes said equivalent convolutional code $G_d$ to produce a resultant message sequence $\underline{m}$ which is supplied to said data user.
2. The method according to claim 1 further comprising the steps of generating an artificial noise sequence $\underline{n}$ and combining with the expanded and convolutionally encoded message sequence $\underline{m}(FG_e)$ to produce said cryptogram $\underline{x}$ so that the total noise in y is $\underline{e} = \underline{n} + \underline{z}$.
3. The method according to claim 1 wherein said expansion function F is a linear, time-invariant function.
4. The method according to claim 1 wherein said expansion function F is a linear, time varying function.

5. The method according to claim 1 wherein said expansion function is a block code.

6. The method according to claim 1 wherein said expansion function is a convolutional code.

7. A system of encryption and channel coding for reliable and secure data communication between a data source and a data user comprising:

an integrated data enciphering and channel encoding system for transforming a message sequence $\underline{m}$ from said data source to a cryptogram $\underline{x}$, said integrated data enciphering and channel encoding system including means for expanding said message sequence $\underline{m}$ with an expansion function F to produce an expanded message sequence $\underline{m}'$ and channel encoding means for encoding said expanded message sequence $\underline{m}'$ using a convolutional code $G_e$ of rate $r_e$ exceeding the computational cutoff rate $R_{comp}$, said means for expanding and said channel encoding means forming an equivalent encoder for encoding said message sequence $\underline{m}$ with a convolutional code $G_d$ of rate $r_d$ less than $R_{comp}$, where $G_d = FG_e$ to produce said cryptogram $\underline{x}$; and an integrated channel decoding and data deciphering system connected to receive a corrupted version of the cryptogram $\underline{y}$ transmitted over a noisy channel characterized by the additive noise sequence $\underline{e}$ and having said computational cutoff rate $R_{comp}$ such that $\underline{y} = \underline{x} + \underline{e} = \underline{m}(FG_e) + \underline{e}$, said integrated channel decoding and data deciphering system consisting of sequential decoding means for sequentially decoding said corrupted version of the cryptogram $\underline{y}$ with said convolutional code $G_d$ to produce a resultant message sequence $\underline{m}$ which is supplied to said data user.

8. The system according to claim 7 wherein said integrated data enciphering and channel encoding system further includes means for generating an artificial noise sequence $\underline{n}$ and combining the same with the expanded and convolutionally encoded message sequence $\underline{m}(FG_e)$ to produce said cryptogram $\underline{x}$ so that the total noise in $\underline{y}$ is $\underline{e} = \underline{n} + \underline{z}$.

9. The system according to claim 7 wherein said means for expanding is a block encoder.

10. The system according to claim 7 wherein said means for expanding is a convolutional encoder.

* * * * *

UNITED STATES PATENT AND TRADEMARK OFFICE
CERTIFICATE OF CORRECTION

PATENT NO. : 4,208,739
DATED : June 17, 1980
INVENTOR(S) : Shyue-Ching LU et al

It is certified that error appears in the above—identified patent and that said Letters Patent are hereby corrected as shown below:

Column 3, line 50 - after "machines" insert -- , -- line 53 - delete "key" insert -- key --

Column 5, line 45, after "threshold" insert -- . --

Signed and Sealed this

Fourth Day of November 1980

[SEAL]

Attest:

SIDNEY A. DIAMOND

Attesting Officer     Commissioner of Patents and Trademarks